United States Patent
Fukada

[19]

[11] Patent Number: 5,899,952
[45] Date of Patent: May 4, 1999

[54] DEVICE FOR ESTIMATING SLIP ANGLE OF VEHICLE BODY THROUGH INTERRELATION THEREOF WITH YAW RATE

[75] Inventor: Yoshiki Fukada, Susono, Japan

[73] Assignee: Toyota Jidosha Kabushiki Kaisha, Toyota, Japan

[21] Appl. No.: 08/762,874

[22] Filed: Dec. 12, 1996

[30] Foreign Application Priority Data

Dec. 27, 1995 [JP] Japan .................................... 7-351933

[51] Int. Cl.$^6$ .............................. G06F 7/00; G06F 17/00
[52] U.S. Cl. .............................. 701/74; 701/75; 303/146
[58] Field of Search .......................... 701/70, 72, 73, 701/74, 75, 36, 38; 180/197; 303/140, 146, 163

[56] References Cited

U.S. PATENT DOCUMENTS

| | | |
|---|---|---|
| 4,942,532 | 7/1990 | Mori . |
| 5,003,480 | 3/1991 | Mori et al. . |
| 5,029,660 | 7/1991 | Raad et al. . |
| 5,267,160 | 11/1993 | Ito et al. . |
| 5,386,365 | 1/1995 | Nagaoka ............................ 364/424.05 |
| 5,412,571 | 5/1995 | Eguchi et al. . |
| 5,500,798 | 3/1996 | Inagaki ............................... 364/424.05 |
| 5,524,079 | 6/1996 | Ishida et al. . |
| 5,557,520 | 9/1996 | Suissa et al. . |
| 5,668,724 | 9/1997 | Ehret et al. ............................... 701/80 |
| 5,676,433 | 10/1997 | Inagaki et al. ........................... 303/146 |
| 5,710,705 | 1/1998 | Eckert ............................... 364/426.028 |
| 5,742,917 | 4/1998 | Matsuno ................................ 701/69 |

FOREIGN PATENT DOCUMENTS

| | | |
|---|---|---|
| 0 338 506 | 10/1989 | European Pat. Off. . |
| 0 465 958 | 1/1992 | European Pat. Off. . |
| 42 00 061 | 7/1993 | Germany . |
| A-62-83247 | 4/1987 | Japan . |
| A-5-502421 | 4/1993 | Japan . |
| A-5-270422 | 10/1993 | Japan . |
| A-7-10782 | 1/1995 | Japan . |

*Primary Examiner*—William A. Cuchlinski, Jr.
*Assistant Examiner*—Tim Wyckoff
*Attorney, Agent, or Firm*—Oliff & Berridge, PLC

[57] ABSTRACT

A device for estimating slip angle of vehicle body of a vehicle, having: means for calculating yaw rate based upon such parameters as detected steering angle, vehicle speed, lateral acceleration and braking forces as variable parameters, the slip angle of the vehicle body estimated by the vehicle body slip angle estimation device, a first feedback factor multiplied to difference between the detected yaw rate and the yaw rate calculated by the yaw rate calculation means, and fixed parameters particular to the vehicle, such that the calculated yaw rate converges to the detected yaw rate; means for calculating slip angle of the vehicle body based upon such parameters as detected steering angle, vehicle speed, lateral acceleration, braking forces and yaw rate, the yaw rate calculated by the yaw rate calculation means, a second feedback factor multiplied to the difference between the detected yaw rate and the yaw rate calculated by the yaw rate calculation means, and fixed parameters particular to the vehicle, such that the calculated yaw rate converges to the detected yaw rate; means for detecting saturation index against the difference between a standard yaw rate based upon the calculations by the yaw rate calculation means and the detected yaw rate; and means for modifying the first and second feedback factors according to the saturation index such that non-linearity between lateral forces acting at the wheels and slip angles of the wheels is compensated for by the modification of the first and second feedback factors.

5 Claims, 10 Drawing Sheets

DEVICE FOR ESTIMATING SLIP ANGLE OF VEHICLE BODY THROUGH INTERRELATION THEREOF WITH YAW RATE

BACKGROUND OF THE INVENTION

1. Field of the Invention

The present invention relates to a device for estimating slip angle of vehicle body, and more particularly, a device for estimating slip angle of vehicle body through cyclically repeated computer feedback calculations of related parameters.

2. Description of the Prior Art

In the vehicle stability control recently getting more popular in the art of computer based running behavior control of vehicles, the slip angle of vehicle body is one of the most desired parameters useful for effectively controlling the running behavior of vehicles. The slip angle of vehicle body is not directly detectable. It must be estimated based upon various directly detectable parameters such as steering angle, vehicle speed, lateral acceleration, yaw rate, etc. However, more essentially, the slip angle of vehicle body is dependent upon the friction coefficient between the wheel tires and the road surface which is not directly detectable, and, still worse, has a non-linearly saturating characteristic. Therefore, it was very difficult to estimate the slip angle of the vehicle body at high accuracy.

In Japanese Patent Laid-open Publication 62-83247, it is described to estimate the slip angle of vehicle body through a comparison of a slip angle of vehicle body estimated from a vehicle model inputted with input data such as steering angle and vehicle speed and a slip angle of vehicle body calculated from lateral acceleration, yaw rate and vehicle speed, while making an adjustment modification of cornering power of the front and rear wheels.

When a vehicle model is employed to estimate running behaviors of a vehicle, estimations are available generally at relatively high accuracy in a linear zone where the tire grip force against the road surface is proportional to the slip angle of wheel, but the accuracy rapidly lowers when the vehicle gets out of the linear zone according to increase of the slip angle of wheel. In the art of estimating a certain parameter by cyclically repeated computer calculations of related parameters, even a minute error of a parameter can be integrated to produce a large error which renders the estimation almost useless.

SUMMARY OF THE INVENTION

In view of such difficulties in estimating a parameter influenced by the non-linearly saturable frictional contact between the vehicle wheels and the road surface by cyclically repeated computer calculations of related parameters, it is the object of the present invention to provide an improved device for estimating the slip angle of vehicle body at high accuracy throughout a linear zone where the tire grip force is proportional to the slip angle of wheel and a non-linear zone where the tire grip force saturates against increase of the slip angle of wheel.

According to the present invention, the above-mentioned object is accomplished by a device for estimating slip angle of vehicle body of a vehicle having front and rear wheels supporting the vehicle body, the vehicle being equipped with means for detecting at least steering angle, vehicle speed, yaw rate, lateral acceleration, and braking forces of the front and rear wheels, the device comprising:

means for calculating yaw rate based upon at least the detected steering angle, vehicle speed, lateral acceleration and braking forces as variable parameters, the slip angle of the vehicle body estimated by the vehicle body slip angle estimation device, a first feedback factor multiplied to the difference between the detected yaw rate and the yaw rate calculated by said yaw rate calculation means, and fixed parameters particular to the vehicle, such that the calculated yaw rate converges to the detected yaw rate;

means for calculating slip angle of the vehicle body based upon at least the detected steering angle, vehicle speed, lateral acceleration, braking forces and yaw rate, the yaw rate calculated by said yaw rate calculation means, a second feedback factor multiplied to the difference between the detected yaw rate and the yaw rate calculated by said yaw rate calculation means, and fixed parameters particular to the vehicle, such that the calculated yaw rate converges to the detected yaw rate;

means for detecting saturation index against the difference between a standard yaw rate based upon the calculations by said yaw rate calculation means and the detected yaw rate; and means for modifying said first and second feedback factors according to said saturation index such that non-linearity between lateral forces acting at the wheels and slip angles of the wheels is compensated for by the modification of said first and second feedback factors.

In the above-mentioned device, said first and second feedback gains may each be calculated in at least three different manners according to increase of the value of said saturation index to provide at least first, second and third gain components, while at least three weighting factors such as first, second and third weighting factors are prepared corresponding to the value of said saturation index so that said first, second and third weighting factors have peak points at different values of said saturation index, and said first and second feedback gains may each be generated by the sum of said first, second and third gain components each being weighted by the corresponding weighting factor.

Further, in the above-mentioned device, when said saturation index is so high as to indicate that said non-linearity substantially exists, said second feedback gain may be determined such that the estimated slip angle of the vehicle body increases in an orientation opposite to that in which the detected yaw rate increases.

Further, in the above-mentioned device, when said difference between the standard yaw rate and the detected yaw rate is different from the yaw rate (either detected or calculated) with respect to the orientation thereof, at least one of said first and second feedback gains may be modified such that lateral force acting at the rear wheels is estimated to be less in said yaw rate and vehicle body slip angle calculations, and when said difference between the standard yaw rate and the detected yaw rate is the same as the yaw rate (either detected or calculated) with respect to the orientation thereof, at least one of said first and second feedback gains may be modified such that lateral force acting at the front wheels is estimated to be less in said yaw rate and vehicle body slip angle calculations.

The present invention attempts to estimate the slip angle of vehicle body through cyclically repeated computer calculations of interrelation between the slip angle of vehicle body and the yaw rate of vehicle body with a feedback gain which conducts the calculations into a convergence. The yaw rate of vehicle body is closely interrelated with the slip angle of vehicle body such that a change of the yaw rate is reflected on a corresponding change of the slip angular velocity (i.e. differential of the slip angle) of vehicle body and vice versa. The yaw rate of vehicle body is directly detectable. Therefore, if an error in the estimation of the slip angle of vehicle body is checked by a corresponding error in the estimation of the yaw rate, while the estimation error of the yaw rate is converged into zero in reference to the directly detected yaw rate, a correct estimation of the slip angle of vehicle body will be available.

In more detail, denoting the differential of estimated slip angle of vehicle body $\beta e$ as $\dot{\beta}e$, the differential of estimated yaw rate of vehicle body $\gamma e$ as $\dot{\gamma}e$, detected yaw rate of vehicle body as $\gamma$, feedback gain of a difference between the detected yaw rate and the estimated yaw rate ($\gamma-\gamma e$) against the slip angle of vehicle body as Kb, feedback gain of the difference between the detected value and the estimated value of the yaw rate against the estimation thereof as Kg, mass of the vehicle body as m, vehicle speed as V, lateral forces acting at the front and rear wheels as Ff and Fr, respectively, the inertial movement of the vehicle body as Iz, and longitudinal distances of the front and rear wheels from the center of gravity of the vehicle body as Lf and Lr, respectively, the following relationships are assumed:

$$\dot{\beta}e = \frac{Ff + Fr}{m*V} - \gamma e + Kb(\gamma - \gamma e) \quad (1)$$

$$\dot{\gamma}e = \frac{Lf*Ff + Lr*Fr}{Iz} + Kg(\gamma - \gamma e) \quad (2)$$

The lateral forces Ff and Fr acting at the front and rear wheels are estimated from the slip angles $\beta f$ and $\beta r$ of the front and rear wheels, respectively, and the cornering powers Cf and Cr of the front and rear wheels, respectively, as follows:

$$Ff = Cf*\beta f \quad (3)$$

$$Fr = Cr*\beta f \quad (4)$$

As well known in the art, the cornering powers Cf and Cr are constant only when the slip angles $\beta f$ and $\beta r$ are relatively small, and gradually decreases to each minimum value when the slip angles $\beta f$ and $\beta r$ increase. $\beta f$ and $\beta r$ can be estimated from the steering angles $\delta f$ and $\delta r$ of the front and rear wheels, the estimated slip angle of vehicle body $\beta e$, the longitudinal distances Lf and Lr of the front and rear wheels from the center of gravity of the vehicle body, yaw rate (as estimated $\gamma e$), and vehicle speed V as follows:

$$\beta fe = \delta f - \beta e - Lf*\gamma e/V \quad (5)$$

$$\beta re = \delta r - \beta e - Lr*\gamma e/V \quad (6)$$

Substituting Equations 5 and 6 for $\beta fe$ and $\beta re$ of Equations 3 and 4, then further substituting Equations 3 and 4 for Ff and Fr of Equations 1 and 3, and expressing the resultant in determination, the following relationship is obtained:

$$\begin{pmatrix} \dot{\beta} \\ \dot{\gamma} \end{pmatrix} = (A - LC)\begin{pmatrix} \beta e \\ \gamma e \end{pmatrix} + B\begin{pmatrix} \delta f \\ \delta r \end{pmatrix} + \gamma\begin{pmatrix} Kb \\ Kg \end{pmatrix} \quad (7)$$

$$A = \begin{pmatrix} -\frac{Cr+Cf}{m*V} & 1+\frac{Cr*Lr-Cf*Lf}{m*V^2} \\ \frac{Cr*Lr-Cf*Lf}{Iz} & -\frac{Cr*Lr^2-Cf*Lf^2}{Iz} \end{pmatrix} = \begin{pmatrix} a11 & a12 \\ a21 & a22 \end{pmatrix}$$

$$B = \begin{pmatrix} \frac{Cf}{m*V} & \frac{Cr}{m*V} \\ \frac{Cf*Lf}{Iz} & -\frac{Cf*Lr}{Iz} \end{pmatrix}$$

$$LC = \begin{pmatrix} 0 & -Kb \\ 0 & -Kg \end{pmatrix}$$

Denoting, for the convenience of operations, $$\begin{pmatrix} \dot{\beta}e \\ \dot{\gamma}e \end{pmatrix} \text{ as } \dot{X}, \begin{pmatrix} \beta e \\ \gamma e \end{pmatrix} \text{ as } X, \begin{pmatrix} \delta f \\ \delta r \end{pmatrix} \text{ as } d, \text{ and } \begin{pmatrix} Kb \\ kg \end{pmatrix} \text{ as } K,$$

Equation 7 is rewritten as follows:

$$\dot{X} = (A-LC)*X + B*d + \gamma*K \quad (8)$$

Further modifying Equation 8:

$$\dot{X} = (A-LC)*X + (A-LC)(A-LC)^{-1}(B*d+\gamma*K) = (A-LC)\{X-(A-LC)^{-1}(-B*d-\gamma*K)\} \quad (9)$$

Therefore, when $(A-LC)^{-1}(-B*d-\gamma*K)$ is denoted by $$Xc\left(=\begin{pmatrix} \beta c \\ \gamma c \end{pmatrix}\right),$$

$$\dot{X} = (A-LC)(X-Xc) \quad (10)$$

It is expected that Equation 10 can be solved such that X converges to Xc. Since this system is two dimensional, it has two poles which will be denoted as p1 and p2. Then, by using the poles p1 and p2, $\beta c$ and $\gamma c$ are expressed as follows:

$$\beta c = \frac{(-a11+p1+p2)|A|-a22*p1*p2}{a2*p1*p2} \quad (11)$$

$$\gamma c = \left(1 - \frac{|A|}{p1*p2}\right)\gamma + \gamma o \quad (12)$$

wherein $\beta o$ and $\gamma o$ are those defined by the following:

$$\begin{pmatrix} \beta o \\ \gamma o \end{pmatrix} = (A-LC)^{-1}*B*d$$

Kb and Kg are as follows:

$$Kb = \frac{(a11-p11-p2)+p1*p2}{a21} + a12 \quad (13)$$

$$Kg = a11 + a22 - p1 - p2 \quad (14)$$

As a first kind of feedback gains Kb and Kg when the slip angles of wheel $\beta f$ and $\beta r$ are within a relatively small value, they may be determined as described in the specification of Japanese Patent Application 7-10782 by the same assignee as the present application, according to which p1 and p2 are expressed by using certain positive constants C11, C12, C21 and C22 as follows:

$$p1 = -C11 - C12/V \quad (15)$$

$$p2 = -C21 - C22/V \quad (16)$$

When the slipping condition advances such that the vehicle spins, the slip angle of vehicle body would be increasing in a direction opposite to the yaw rate. Therefore, if the vehicle performance is simulated such that, in the relationship of Equation 11, the proportioning factor of $\gamma$ is negative, in other words, the estimated slip angle increases in the orientation opposite to that in which the estimated yaw rate increases, the estimation will be more correct. On the other hand, since the estimated yaw rate is to converge to the detected yaw rate, the proportioning factor of $\gamma$ in Equation 12 should be positive. Therefore, in such a vehicle operating condition, p1 and p2 may desirably be set to satisfy the following conditions:

$$\frac{(-a11 + p1 + p2)|A| - a22 * p1 * p2}{a2 * p1 * p2} < 0 \tag{17}$$

$$\left(1 - \frac{|A|}{p1 * p2}\right) > 0 \tag{18}$$

The values of p1 and p2 which satisfy the conditions of Equations 17 and 18 are plotted to present such hatched patterns in the coordinates of p1 and p2 as shown in FIGS. 15 and 16, wherein FIG. 15 represents a pattern when the vehicle speed is relatively low, while FIG. 16 represents a pattern when the vehicle speed is relatively high. The pattern changes gradually from that shown in FIG. 15 to that shown in FIG. 16 along with increase of vehicle speed.

When the slip angle of wheels $\beta f$ and $\beta r$ increase further to such a value around $\beta m$ in FIG. 17 where the lateral forces Ff and Fr acting at the front and rear wheels have largely lost the proportional relationship against the slip angle of wheels, the estimation is further modified.

For such a zone as around Aim the relationship between the lateral forces Ff and Fr and the estimated slip angles of wheel $\beta fe$ and $\beta re$ are assumed as follows:

$$Ff = Cf * \beta fe + Ff0 + \Delta Ff \tag{19}$$

$$Fr = Cr * \beta re + Fr0 + \Delta Fr \tag{20}$$

wherein $\Delta Ff$ and $\Delta Fr$ include estimation errors of the cornering power and the road surface friction coefficient $\mu$. Although Ff0 and Fr0 are not constants but are in fact functions of $\beta fe$ and $\beta re$, Ff0 and Fr0 can be approximated to as constants at and around $\beta m$.

Substituting Equations 19 and 20 for Ff and Fr of Equations 1 and 2, and rearranging the resultant, with Laplace transformation, the relationships between $\Delta Ff$, $\Delta Fr$ and $\beta e$ and $\gamma e$ are obtained as follows:

$$\begin{pmatrix} s\beta e \\ s\gamma e \end{pmatrix} = \tag{21}$$

$$\begin{pmatrix} \frac{-(Cf + Cr)}{m * V} & \alpha + \frac{-Cf * Lf + Cr * Lr}{m * V^2} \\ \frac{-Cr * Lr + Cf * Lf}{Iz} & -Kg - \frac{Cf * Lf^2 + Cr * Lr^2}{Iz} \end{pmatrix}$$

$$\begin{pmatrix} \beta e \\ \gamma e \end{pmatrix} + \begin{pmatrix} \frac{\Delta Ff + \Delta Fr}{m * V} \\ \frac{\Delta Ff * Lf - \Delta Fr * Lr}{Iz} \end{pmatrix}$$

and, as further rearranged, $$\begin{pmatrix} \beta e \\ \gamma e \end{pmatrix} = \frac{1}{det} \begin{pmatrix} s + Kg + \frac{Cf * Lf^2 + Cr * Lr^2}{Iz} & \alpha + \frac{-Cf * Lf + Cr * Lr}{mV^2} \\ \frac{-Cr * Lr + Cr * Lr}{Iz} & s + \frac{Cf + Cr}{m * V} \end{pmatrix} * \begin{pmatrix} \frac{\Delta Ff + \Delta Fr}{m * V} \\ \frac{\Delta Ff * Lf - \Delta Fr * Lr}{Iz} \end{pmatrix} \tag{22}$$

wherein
$\alpha = -(1 + Kg)$, and $$det = s^2 + \left(Kg + \frac{Cf * Lf^2 + Cr * Lr^2}{Iz * V} + \frac{Cf + Cr}{m * V}\right)s + \tag{23}$$

$$\frac{(m * V^2 * \alpha - Cf * Lf + Cr * Lr)(Cf * Lf - Cr * Lr)}{Iz * m * V^2} + \frac{(Cf + Cr)(Kg * Iz * V + Cf * Lf^2 + Cr * Lr^2)}{Iz * m * V^2}$$

Since the lateral force estimated in the non-linear zone would include a large error, it is considered to be desirable that, if the front wheels are in saturation of tire grip, the transfer function from $\Delta Ff$ to $\beta e$ is made zero, while if the rear wheels are in saturation of tire grip, the transfer function from Fr to $\beta e$ is made zero, by $\alpha$ being so adjusted.

In order to make the transfer function from $\Delta Ff$ to $\beta e$ zero, $\alpha$ is to be such as $$\alpha = -\frac{Iz * (Kg + s)}{m * V * Lf} - \frac{Cr * Lr * (Lf + Lr)}{m * V * Lf^2} \tag{24}$$

In order to make the transfer function from $\Delta Fr$ to $\beta e$ zero, $\alpha$ is to be such as $$\alpha = -\frac{Iz * (Kg + s)}{m * V * Lr} + \frac{Cf * Lf * (Lf + Lr)}{m * V * Lr^2} \tag{25}$$

Further, since it is considered that Cf and Cr are both small in such a non-linear zone, they will be approximated to zero. Thus, the value of $\alpha$ is finally to be made as follows:

$$\alpha = -\frac{Iz * Kg}{m * V * Lf} \tag{26}$$

when the front wheels are saturated, i.e. in understeer, and $$\alpha = -\frac{Iz * Kg}{m * V * Lr} \tag{27}$$

when the rear wheels are saturated, i.e. in oversteer.

BRIEF DESCRIPTION OF THE DRAWINGS

In the accompanying drawings.

DESCRIPTION OF THE EMBODIMENT

In the following, the present invention will be described with respect to an embodiment thereof with reference to the accompanying drawings.

Figure 1:
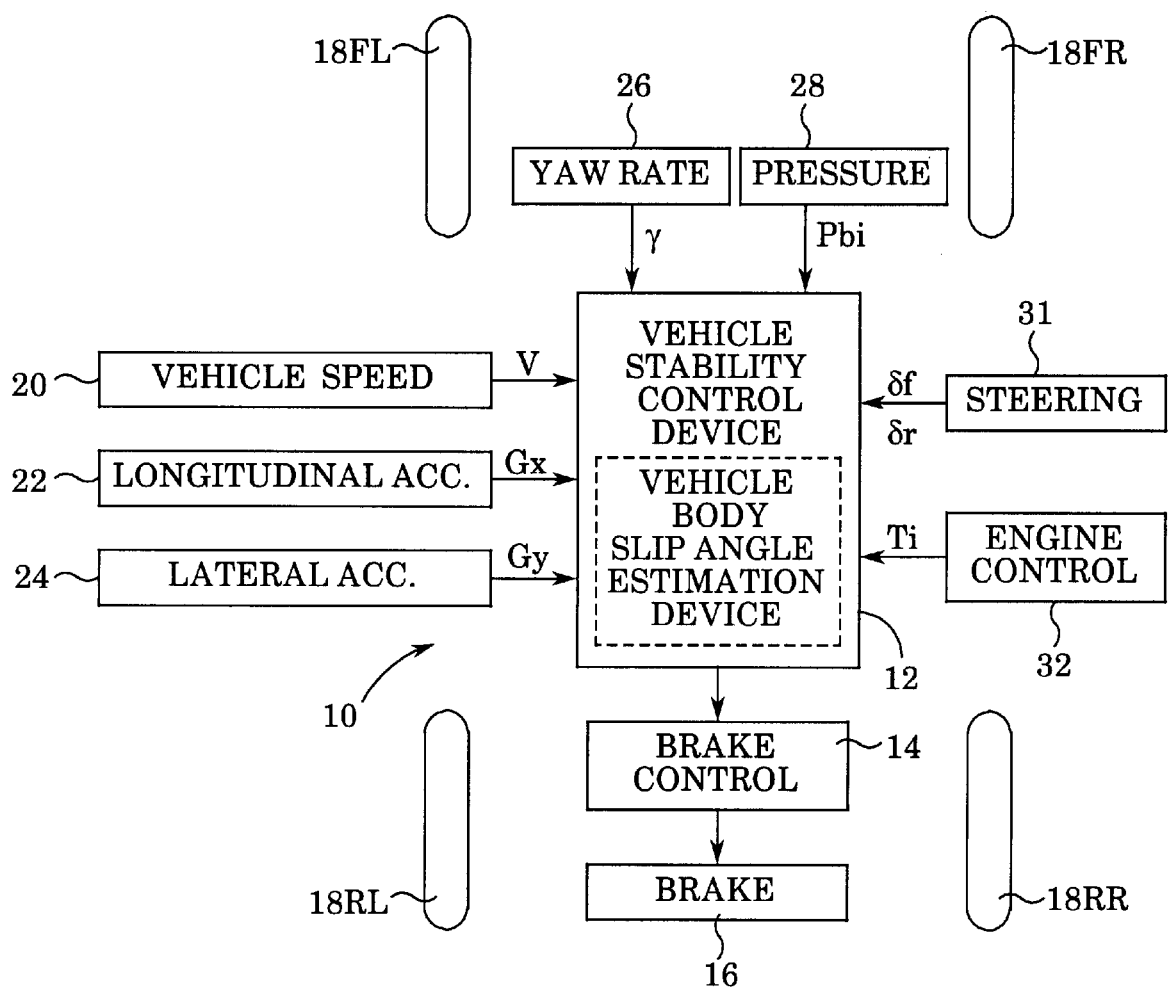
FIG. 1 is a diagrammatical illustration of a vehicle stability control system in which the device for estimating slip angle of vehicle body according to the present invention is incorporated.

Referring to FIG. 1, the device for estimating slip angle of vehicle body according to the present invention is incorporated in a vehicle stability control device 12 of a vehicle 10 diagrammatically illustrated by front right, front left, rear right and rear left wheels 18FR, 18FL, 18RR and 18RL. The block of the vehicle stability control device 12 may be deemed to also represent the body of the vehicle, if necessary. The vehicle stability control device 12 is supplied with signals representing vehicle speed V from a vehicle speed sensor 20, longitudinal acceleration Gx from a longitudinal acceleration sensor 22, lateral acceleration Gy from a lateral acceleration sensor 24, yaw rate $\gamma$ from a yaw rate sensor 26, brake fluid pressures Pbi of wheel cylinders of the respective wheels from pressure sensors 28, front steering angle $\delta f$ and rear steering angle $\delta r$ from a four wheel steering means 31, and traction forces Ti of the respective wheels from an engine control means 32. The vehicle is equipped with a brake control means 14 and brakes 16, so that the brakes are actuated by the brake control means 14 under the control of the vehicle stability control device 12, as described in detail in co-pending patent applications assigned to the same assignee as the present application. U.S. Pat. Nos. 5,704,696; 5,704,695; 5,782,543; 5,813,732; 5,707,120; 5,727,853; and 5,709,439 should be referred to for such vehicle stability controls when desired.

Although not shown in the figure, the vehicle stability control device 12 and the device for estimating slip angle of vehicle body according to the present invention incorporated therein may, in fact, be constructed by an electronic computer of a standard construction including a central processing unit, a read only memory, a random access memory, input port means, output port means, and bi-lateral common bus means interconnecting these elements.

The device for estimating slip angle of vehicle body according to the present invention carries out a series of calculations described hereinbelow with reference to FIGS. 2–7, repetitively at a predetermined time cycle, so as continually to pursue converged solutions of Equations 1 and 2 while maintaining interrelation therebetween, replacing changes of analogue quantities by digital integration with feedback adjustment, particular to electronic computers.

Figure 2:
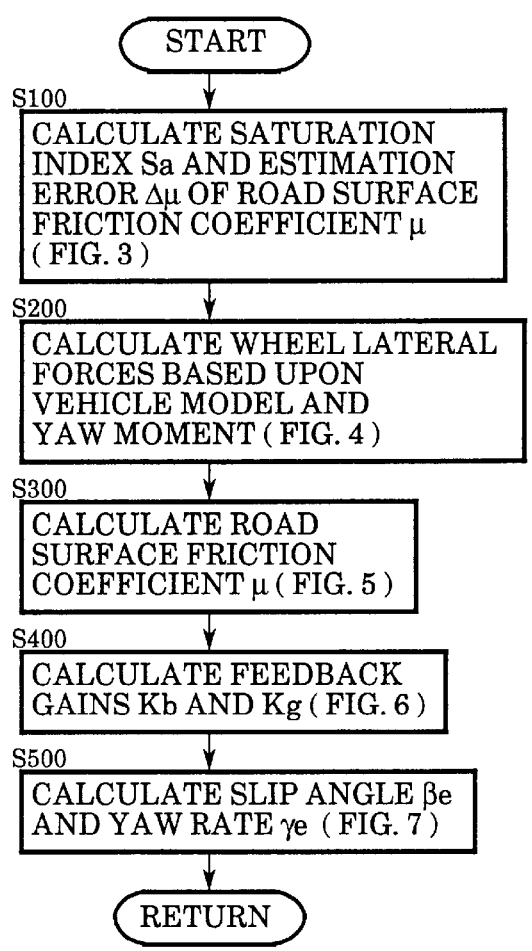
FIG. 2 is a flowchart showing the overall operation carried out by the device for estimating slip angle of vehicle body according to the present invention.

Referring to FIG. 2 showing the outline of calculations, in step 100, the input signals are read in, and a parameter herein called "saturation index Sa" and estimation error $\Delta\mu$ of friction coefficient of road surface, both described in detail hereinbelow, are calculated according to the routine shown in FIG. 3.

Figure 4:
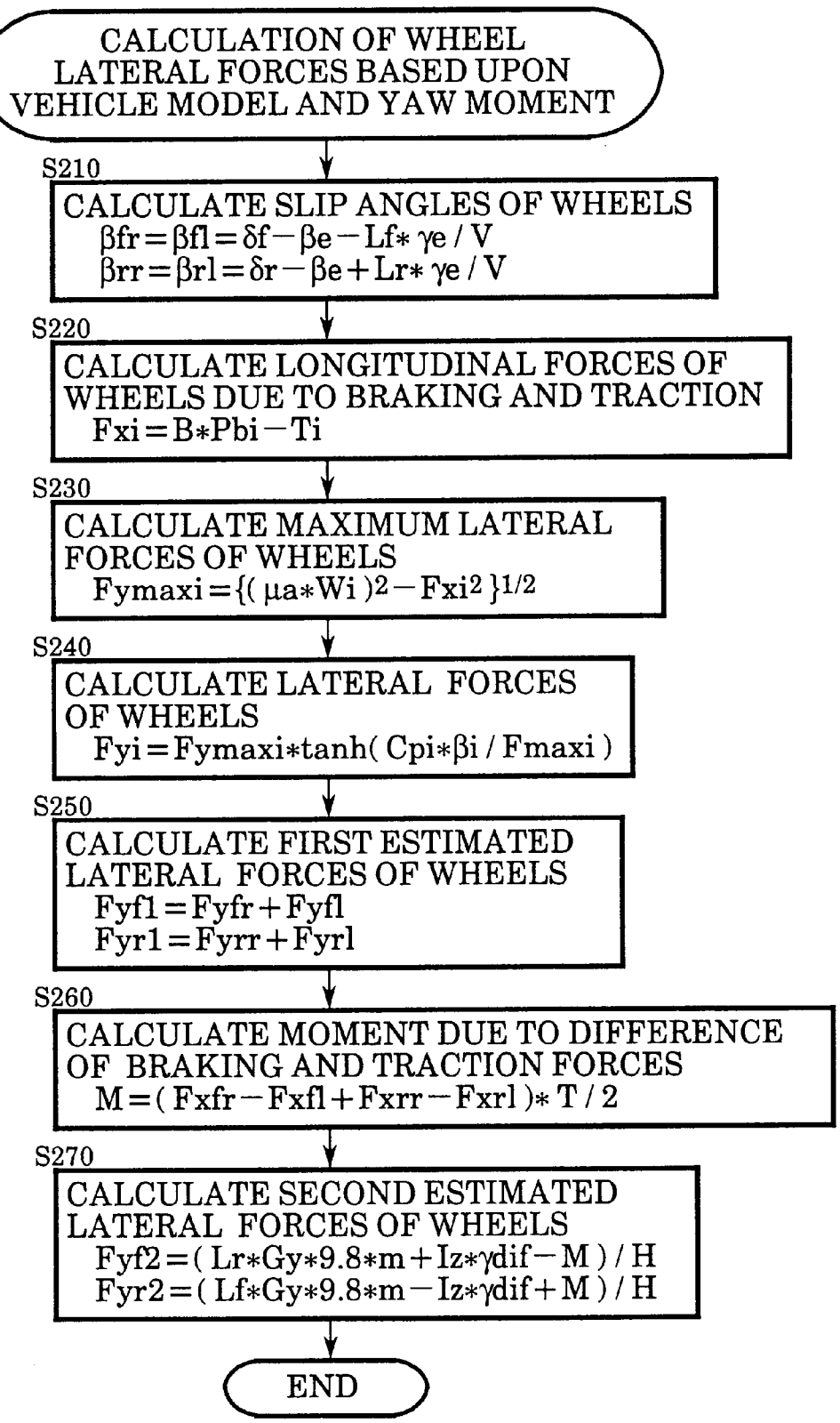
FIG. 4 is a flowchart showing the operation of step 200 of FIG. 2 for the calculation of wheel lateral forces based upon vehicle model and yaw moment in more detail.

In step 200, tire lateral forces are calculated in two different ways according to the routine shown in FIG. 4, such that a first tire lateral force is calculated based upon a vehicle model and a second tire lateral force is calculated based upon yaw moment which is substantially dependent upon difference of braking and traction forces acting at four wheels.

Figure 5:
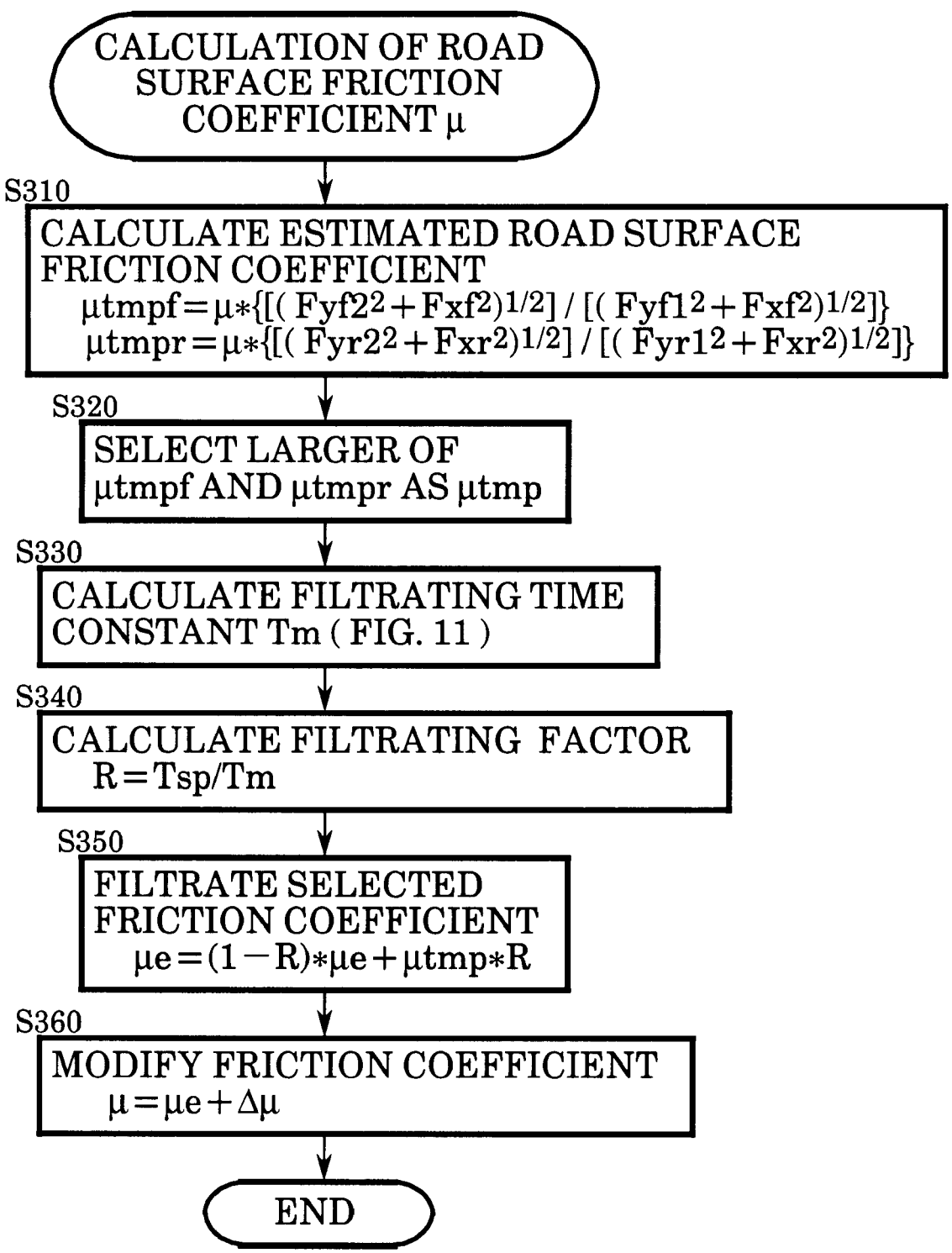
FIG. 5 is a flowchart showing the operation of step 300 of FIG. 2 for the calculation of road surface friction coefficient in more detail.

In step 300, friction coefficient $\mu$ of road surface is estimated according to the routine shown in FIG. 5, such that the estimation is repetitively adjusted by comparison of the tire lateral forces calculated based upon the vehicle model and the tire lateral forces calculated based upon the yaw moment.

Figure 6:
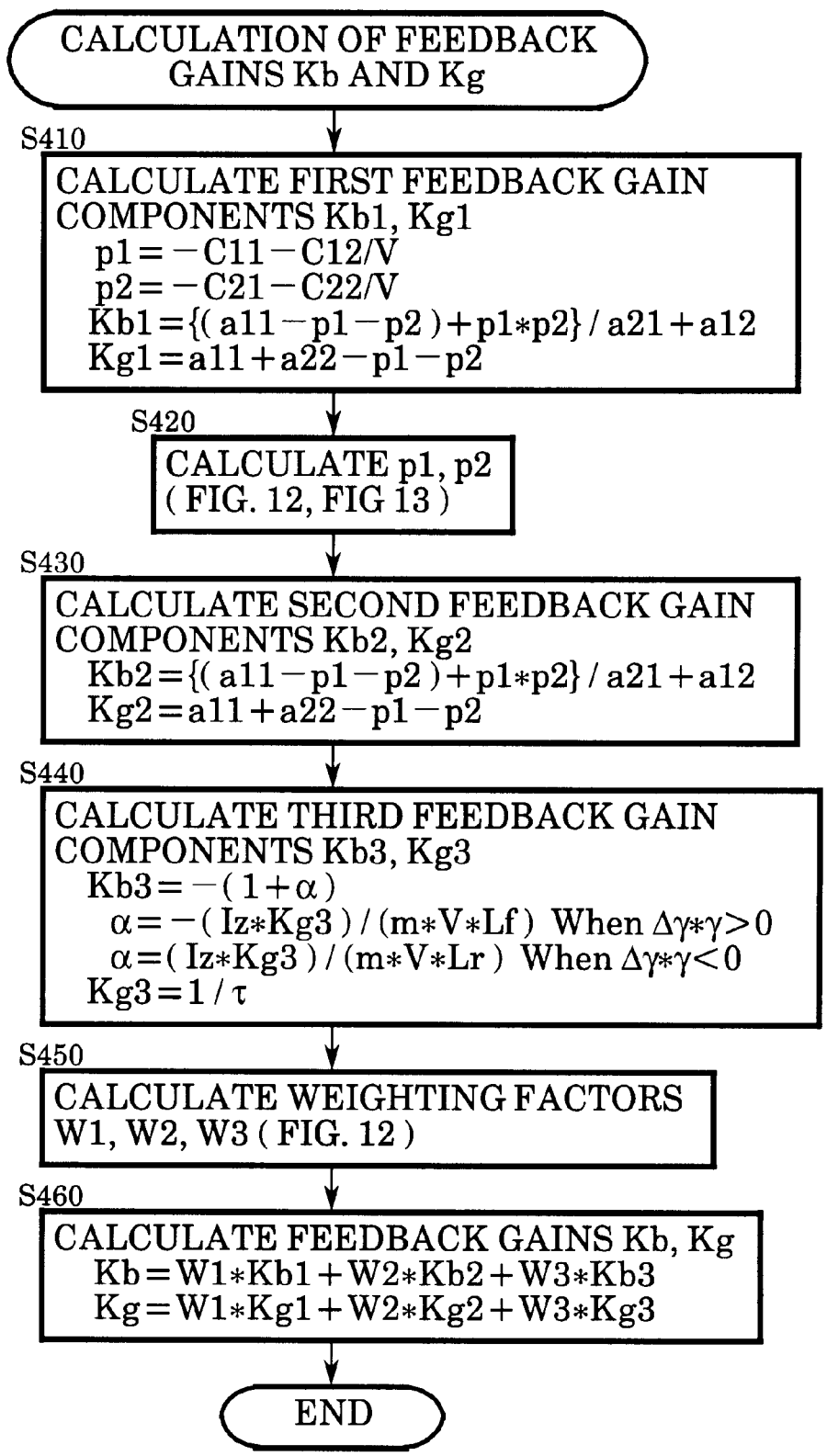
FIG. 6 is a flowchart showing the operation of step 400 of FIG. 2 for the calculation of feedback gains Kb and Kg in more detail.

In step 400, the feedback gains Kb and Kg are calculated according to the routine shown in FIG. 6.

Figure 7:
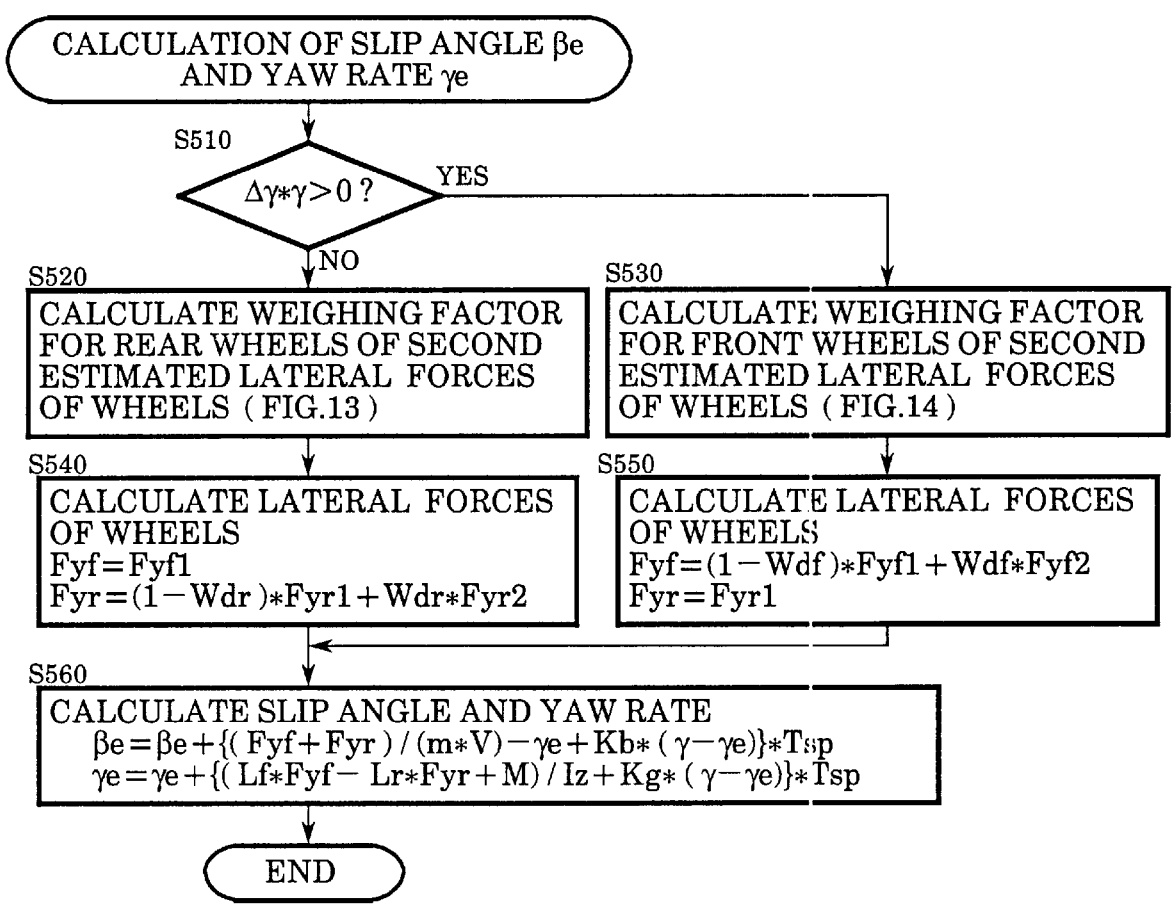
FIG. 7 is a flowchart showing the operation of step 500 of FIG. 2 in more detail.

In step 500, slip angle $\beta e$ and yaw rate $\gamma e$ of the vehicle body are estimated according to the routine shown in FIG. 7.

Next, each step will be described in more detail.

Figure 3:
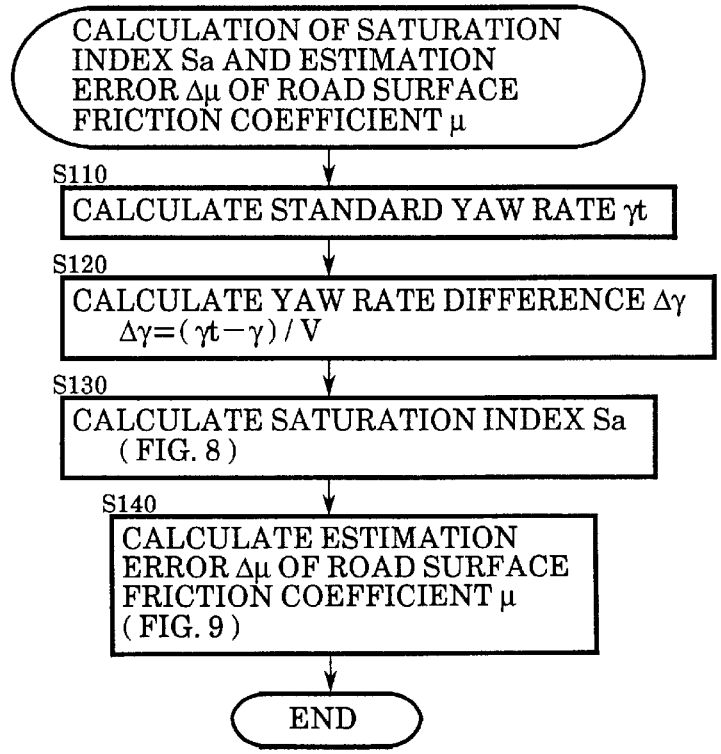
FIG. 3 is a flowchart showing the operation of step 100 of FIG. 2 for the calculation of saturation index Sa and estimation error $\Delta \mu$ of road surface friction coefficient $\mu$ in more detail.

Referring first to FIG. 3, the calculation of the saturation index Sa and the estimation error $\Delta\mu$ of road surface friction coefficient $\mu$ will be described.

In step 110, a target yaw rate $\gamma c$ is calculated based upon vehicle speed V, steering angle $\delta f$ and $\delta r$, wheel base H, and an appropriate proportional constant Kh, and then $\gamma c$ is modified for a primary delay by the well know Laplace function $1/(Tt+s)$ to obtain a standard yaw rate $\gamma t$ as follows:

$$\gamma c = V^*(\delta f - \delta r)/\{(1+Kh^*V^2)^*H\} \quad (28)$$

$$\gamma t = \gamma c/(1+Tt^*s) \quad (29)$$

In step 120, yaw rate difference $\Delta\gamma$ is calculated as follows:

$$\Delta\gamma = (\gamma t - \gamma)/V \quad (30)$$

Figure 8:
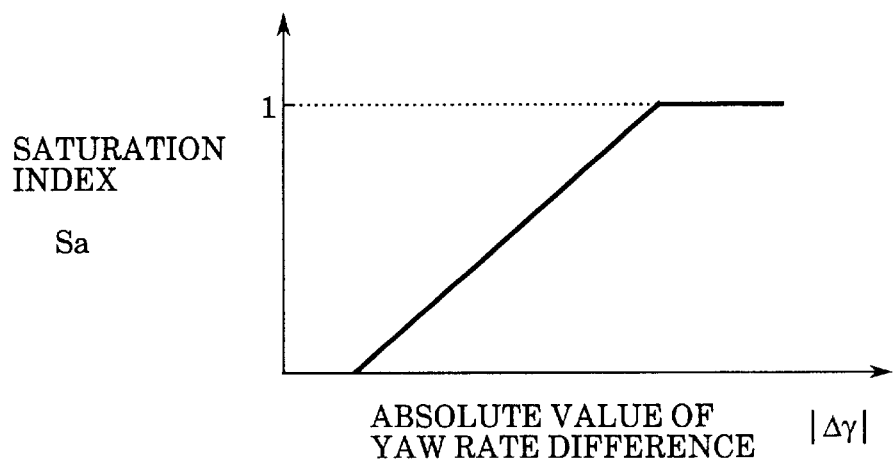
FIG. 8 is a map set up for the relationship between the absolute value of yaw rate difference $\Delta\gamma$ and saturation index Sa.

In step 130, referring to a map such as shown in FIG. 8, the saturation index Sa is calculated against the absolute value of $\Delta\gamma$, so as to generate a parameter which indicates the degree of tire grip saturation such as to increase along with increase of the absolute value of $\Delta\gamma$ until it saturates.

Figure 9:
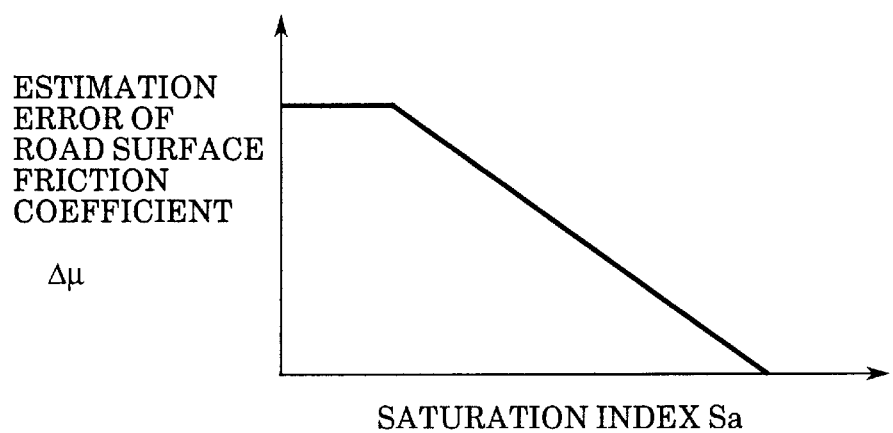
FIG. 9 is a map set up for the relationship between saturation index Sa and estimation error of road surface friction coefficient $\Delta\mu$.

In step 140, referring to a map such as shown in FIG. 9, the estimation error $\Delta\mu$ of road surface friction coefficient $\mu$ is calculated against the saturation index Sa, such as to get smaller as the saturation index Sa increases.

Next, referring to FIG. 4, the calculation of tire lateral forces based upon vehicle model and yaw moment will be described.

In step 210, denoting the longitudinal distance of front and rear wheels (axles) from the center of gravity of the vehicle body as Lf and Lr, respectively, slip angles $\beta i$ (i=fr, fl, rr, rl) of the respective wheels are estimated based upon steering angles $\delta f$ and $\delta r$, vehicle speed V, vehicle body slip angle $\beta e$ (as estimated in a previous cycle), and yaw rate $\gamma e$ (also as estimated in a previous cycle), as follows:

$$\beta fr=\beta fl=\delta f-\beta e-Lf^*\gamma e/V \qquad (31)$$

$$\beta rr=\beta rl=\delta r-\beta e+Lr^*\gamma e/V \qquad (32)$$

In step 220, denoting a conversion factor of brake fluid pressures Pbi (i=fr, fl, rr, rl) to braking forces, i.e. longitudinal forces of the respective wheels as B, the traction forces applied to the respective wheels as Ti(i=fr, fl, rr, rl), the longitudinal forces Fxi (i=fr, fl, rr, rl) are estimated as follows:

$$Fxi=B^*Pbi-Ti \qquad (33)$$

In step 230, loads Wi (i=fr, fl, rr, rl) on respective wheels are calculated based upon vehicle weight m, longitudinal acceleration Gx and lateral acceleration Gy, and maximum lateral forces Fymaxi (i=fr, fl, rr, rl) of the respective wheels are estimated as follows:

$$Fymaxi=\{(\mu^* Wi)^2-Fxi^2\}^{1/2} \qquad (34)$$

In step 240, denoting the cornering power of the respective wheels as Cpi (i=fr, fl, rr, rl), lateral forces Fyi (i=fr, fl, rr, rl) of the respective wheels are estimated as follows:

$$Fyi=Fymaxi^*\tanh (Cpi^*\beta i/Fymaxi) \qquad (35)$$

Figure 10:
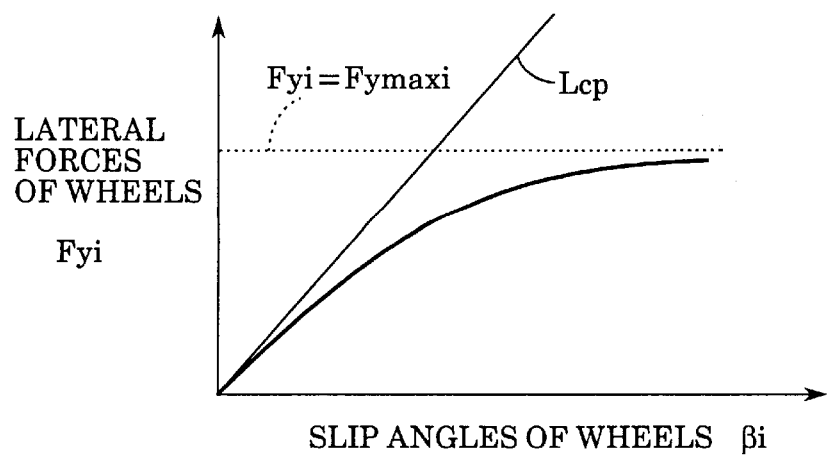
FIG. 10 is a map showing the relationship between slip angles of wheels $\beta i$ (i=f, r) and lateral forces of wheels.

Or, lateral forces Fyi of the respective wheels may be obtained from a map such as shown in FIG. 10 against the slip angle $\beta i$, wherein the straight line Lcp represents the cornering power.

In step 250, first estimated lateral forces of the front and rear wheels Fyf1 and Fyr1 are estimated as follows:

$$Fyf1=Fyfl+Fyfr \qquad (36)$$

$$Fyr1=Fyrl+Fyrr \qquad (37)$$

In step 260, denoting the tread of the vehicle as T, yaw moment M due to difference of the braking forces at the respective wheels is calculated as follows:

$$M=(Fxfr-Fxfl+Fxrr-Fxrl)^*T/2 \qquad (38)$$

In step 270, based upon the inertial moment of the vehicle Iz and differential $\gamma$ (denoted as $\gamma$dif) of yaw rate $\gamma$, second estimated lateral forces of the front and rear wheels Fyf2 and Fyr2 are estimated as follows:

$$Fyf2=(Lr^*Gy^*9.8^*m+Iz^*\gamma\text{dif}-M)/H \qquad (39)$$

$$Fyr2=(Lf^*Gy^*9.8^*m-Iz^*\gamma\text{dif}+M)/H \qquad (40)$$

Next, referring to FIG. 5, the estimation of road surface friction coefficient $\mu$ will be described.

In step 310, assuming that the ratio of the tire grip force based upon the second estimated lateral force to that based upon the first estimated lateral force is equivalent to the ratio of the real value of road surface friction coefficient to the value of the road surface friction coefficient estimated in the previous cycle, the real values of the friction coefficient of the front and rear wheels are estimated as follows:

$$\mu tmpf=\mu^*(Fyf2^2+Fxf^2)^{1/2}/(Fyf1^2+Fxf^2)^{1/2} \qquad (41)$$

$$\mu tmpr=\mu^*(Fyr2^2+Fxr^2)^{1/2}/(Fyr1^2+Fxr^2)^{1/2} \qquad (42)$$

In step 320, the larger of $\mu$t mpf and $\mu$t mpr is selected as an estimated road surface friction coefficient $\mu$tmp. The reason for selecting the larger of $\mu$tmpf and $\mu$tmpr for use is in that, when the road surface friction coefficient is estimated to be smaller than the actual value thereof, the vehicle stability control may allow the slip angle of the vehicle body to become too much.

Figure 11:
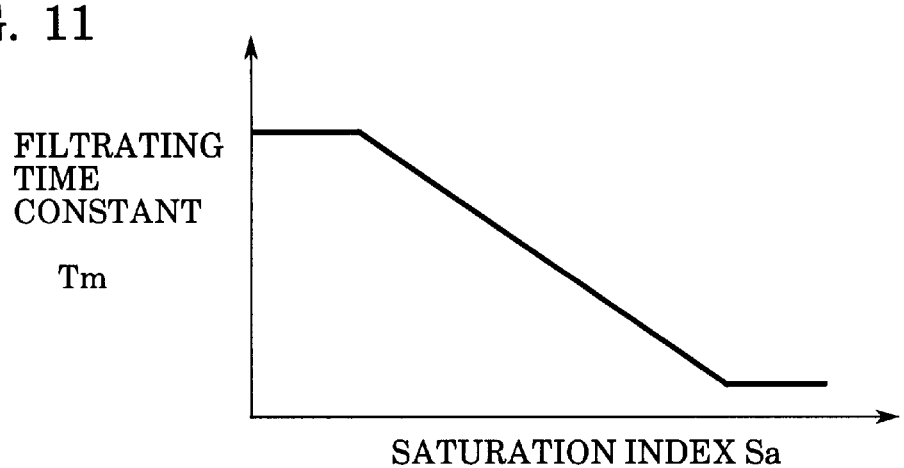
FIG. 11 is a map set up for the relationship between saturation index Sa and filtrating time constant Tm.

In step 330, referring to a map such as shown in FIG. 11, a time constant Tm for filtrating $\mu$tmp is determined against the saturation index Sa, to be smaller as the saturation index Sa increases.

In step 340, denoting a sampling time as Tsp, a filtrating factor R is calculated as follows:

$$R=Tsp/Tm \qquad (43)$$

In step 350, $\mu$tmp is filtrated according to the filtrating factor R to obtain estimated friction coefficient is $\mu$ as follows:

$$\mu e=(1-R)^* \mu e+\mu tmp^*R \qquad (44)$$

In step 360, the road surface friction coefficient $\mu$ is finally estimated by compensating $\mu e$ by $\Delta\mu$ obtained in step 140, as follows:

$$\mu=\mu e+\Delta\mu \qquad (45)$$

Next, referring to FIG. 6, the calculation of the feedback gains Kb for the estimation of the slip angle of vehicle body and Kg for the estimation of the yaw rate will be described. In this routine, three kinds of feedback gains are calculated as first, second and third feedback gain components Kb1, Kb2 and Kb3 and Kg1, Kg2 and Kg3 to estimate Kb and Kg, respectively, by weighted summing combination of such gain components.

In step 410, based upon calculations of p1 and p2 according to Equations 15 and 16, the first feedback gain components Kb1 and Kg1 are calculated according to Equations 13 and 14, as follows:

$$Kb1=\{(\text{all}-p1-p2)+p1^*p2\}/a21+a12 \qquad (46)$$

$$Kg1=\text{all}+a22-p1-p2 \qquad (47)$$

Figure 15:
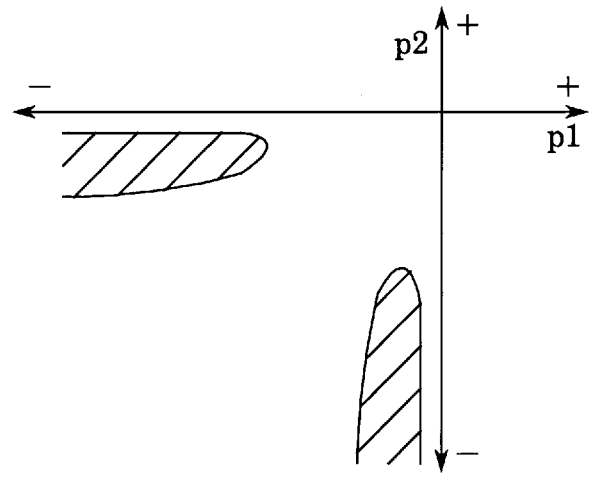
FIG. 15 is a graph showing distribution area of p1 and p2 of tire grip saturating state at relatively low vehicle speed.
Figure 16:
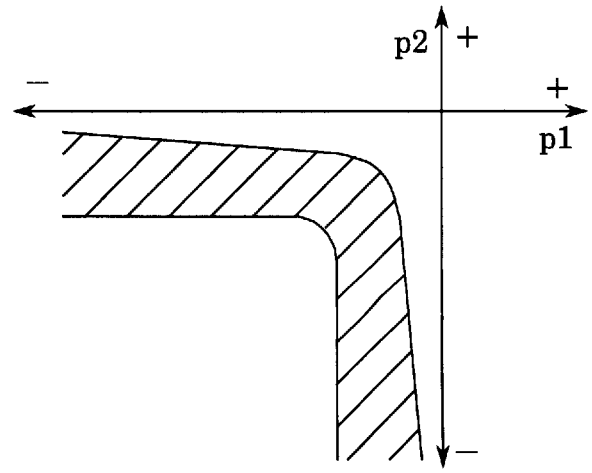
FIG. 16 is a graph showing distribution area of p1 and p2 of tire grip saturating state at relatively high vehicle speed.
Figure 17:
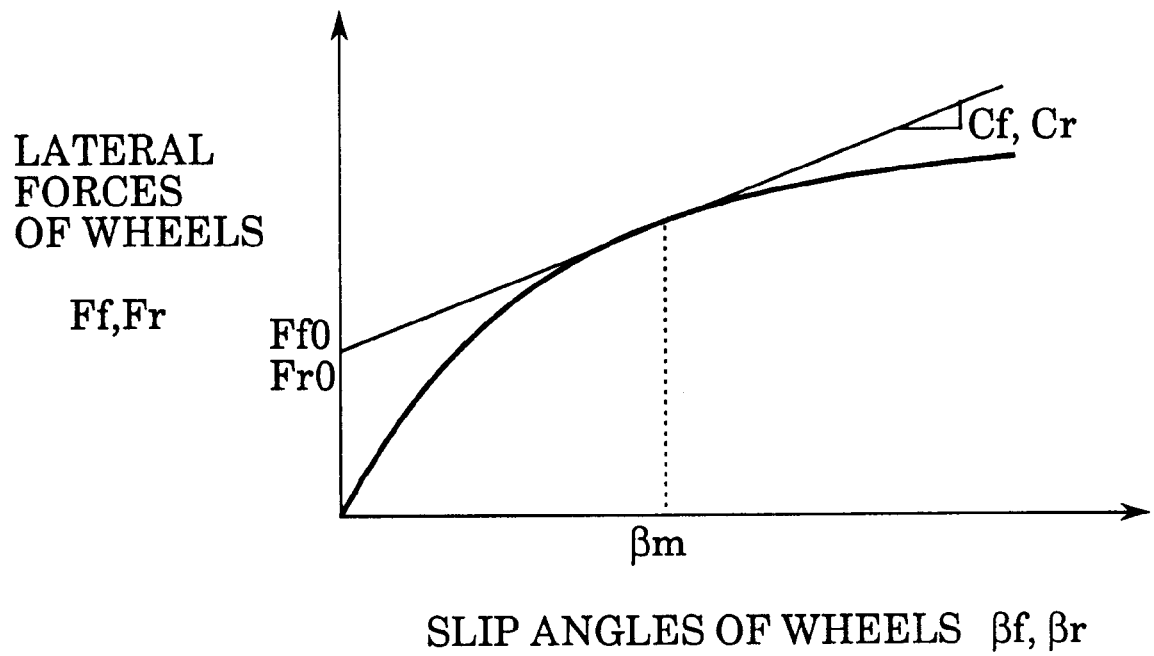
FIG. 17 is a map showing the relationship between slip angles of wheels $\beta i$ (i=f, r) and lateral forces of wheels for a local estimation in a tire grip saturated zone.

In step 420, parameters p1 and p2 for calculating the second feedback gain components Kb2 and Kg2 are determined according to vehicle speed to be such values as described with reference to FIGS. 15 and 16, so as to be in the hatched area of FIG. 15 when the vehicle speed is relatively low, or to be in the hatched area of FIG. 16 when the vehicle speed is relatively high.

In step 430, by using the values of p1 and p2 obtained above, the second feedback gain components Kb2 and Kg2 are calculated as follows. Further detail is described later:

$$Kb2=\{(\text{all}-p1-p2)+p1^*p2\}/a21+a12 \qquad (48)$$

$$Kg2=\text{all}+a22-p1-p2 \qquad (49)$$

In step 440, the third feedback gain components Kb3 and Kg3 are calculated as follows, wherein $\tau$ is a constant:

$$Kb3=1/\tau \qquad (50)$$

$$Kg3=-(1+\alpha)$$

$$\alpha=-(Iz^*Kg3)/(m^*V^*Lf) \text{ when } \Delta\gamma^*\gamma>0 \qquad (51)$$

$$\alpha=(Iz^*Kg3)/(m^*V^*Lf) \text{ when } \Delta\gamma^*\gamma>0 \qquad (52)$$

Figure 12:
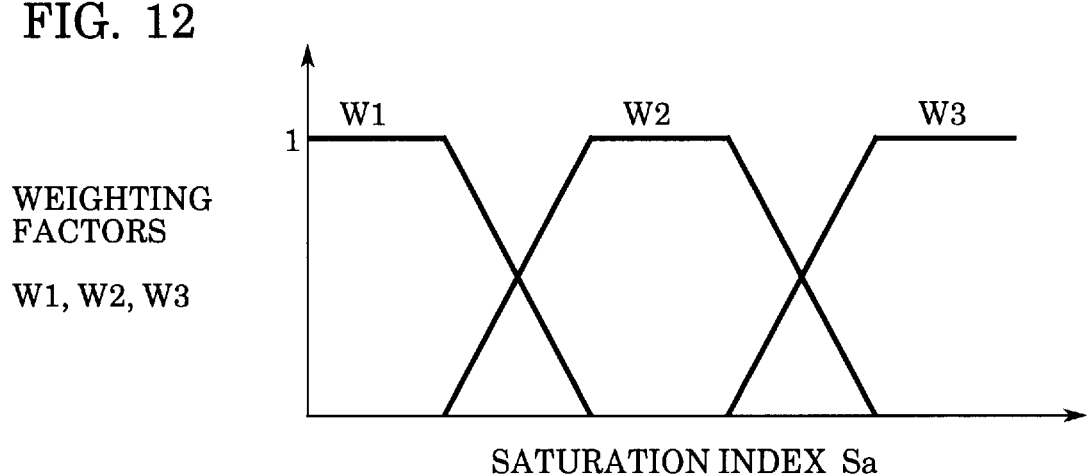
FIG. 12 is a map set up for the relationship between saturation index Sa and weighting factors W1, W2 and W3.

In step 450, referring to a map such as shown in FIG. 12, weighting factors W1, W2 and W3 for the first, second and third feedback gain components are determined against the saturation index Sa.

In step 460, the feedback gains Kb and Kg are finally calculated as a weighted sum of Kb1, Kb2 and Kb3 and Kg1, Kg2 and Kg3, respectively, follows:

$$Kb = W1*Kb1 + W2*Kb2 + W3*Kb3 \tag{53}$$

$$Kg = W1*Kg1 + W2*Kg2 + W3*Kg3 \tag{54}$$

Next, referring to FIG. 7, the final calculation of the slip angle of vehicle body γe and yaw rate γe will be described.

In step 510, it is judged if the vehicle is in an oversteered condition with the tire grip force of the rear wheels being saturated with Δγ*γ being negative, or in an understeered condition with the tire grip force of the front wheels being saturated with Δγ*γ being positive. (In this judgment, γ may be either the detected yaw rate or the estimated yaw rate.)

When the judgment of step 510 is no, i.e. the vehicle is in an oversteer, the control process proceeds to step 520, whereas when the judgment is yes, i.e. the vehicle is in an understeer, the control process proceeds to step 530.

Figure 13:
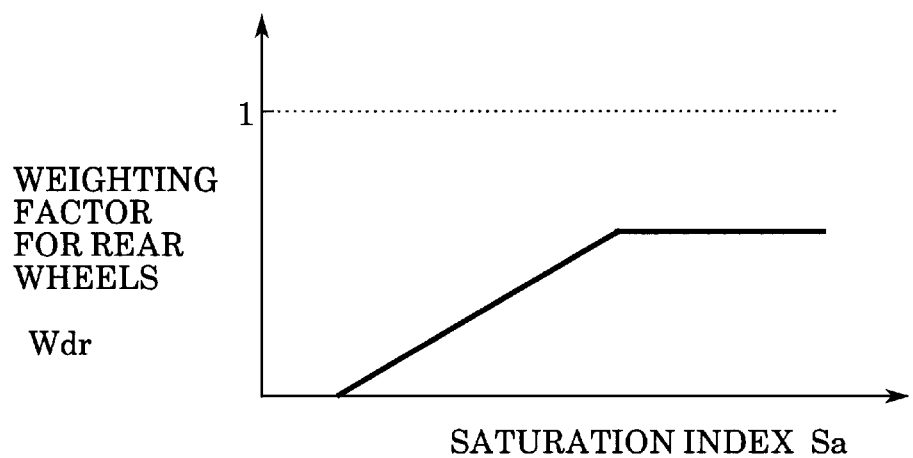
FIG. 13 is a map set up for the relationship between saturation index Sa and weighting factor for rear wheels in oversteer state.

In step 520, referring to a map such as shown in FIG. 13, a weighting factor Wdr for the second estimated lateral force Fyr2 of the rear wheels is determined against the saturation index Sa.

In step 540, lateral forces Fyf and Fyr of the front and rear wheels are calculated by using Wdr, so that, in the estimation of lateral force acting at the rear wheels, the weight of the first estimated lateral force Fyr1 is more decreased relative to the second estimated lateral force Fyr2 as the saturation index Sa larger, as follows:

$$Fyf = Fyf1 \tag{55}$$

$$Fyr = (1 - Wdr)*Fyr1 + Wdr*Fyr2 \tag{56}$$

Figure 14:
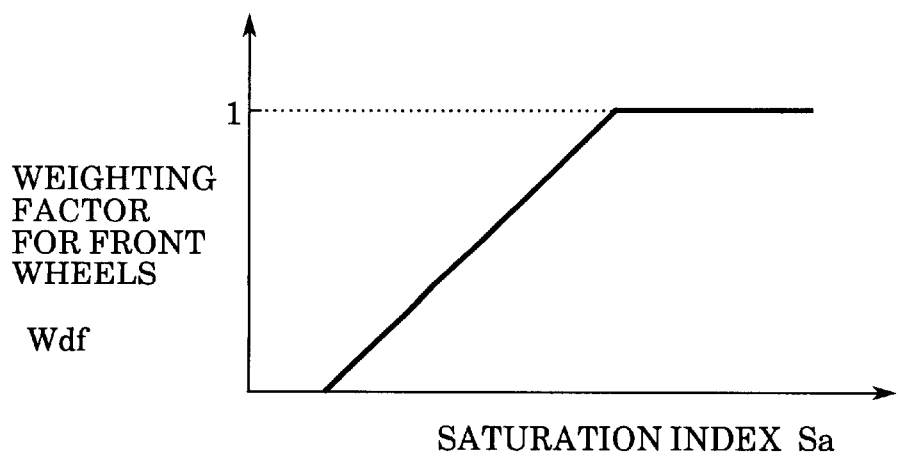
FIG. 14 is a map set up for the relationship between saturation index Sa and weighting factor for front wheels in understeer state.

On the other hand, in step 530, referring to a map such as shown in FIG. 14, a weighting factor Wdf is estimated against the saturation index Sa for the second estimated lateral force Fyf2 of the front wheels.

In step 550, lateral forces Fyf and Fyr of the front and rear wheels are calculated by using Wdf as follows:

$$Fyf = (1 - Wdf)*Fyr1 + Wdf*Fyf2 \tag{57}$$

$$Fyr = Fyr1 \tag{58}$$

In step 560, the slip angle of vehicle body βe and the yaw rate γe are estimated as follows:

$$\beta e = \beta e + \left\{ \frac{Fyf + Fyr}{m*V} - \gamma e + Kb(\gamma - \gamma e) \right\} * Tsp \tag{59}$$

$$\gamma e = \gamma e + \left\{ \frac{Lf*Fyf - Lr*Fyr + M}{Iz} + Kg(\gamma - \gamma e) \right\} * Tsp \tag{60}$$

Although the invention has been described in detail with reference to a preferred embodiment thereof, it will be apparent for those skilled in the art that various modifications are possible with respect to the shown embodiment without departing from the spirit of the present invention.

I claim:

1. A device for estimating slip angle of vehicle body of a vehicle having front and rear wheels supporting the vehicle body, the vehicle being equipped with means for cyclically detecting at least steering angle, vehicle speed, and yaw rate, the device comprising:

means for cyclically calculating yaw rate based upon at least the last detected steering angle, and vehicle speed, as variable parameters, the slip angle of the vehicle body last estimated by the vehicle body slip angle estimation device, a first feedback factor multiplied to a difference between the last detected yaw rate and the yaw rate last calculated by said yaw rate calculation means, and fixed parameters particular to the vehicle, such that the cyclically calculated yaw rate converges to the last detected yaw rate;

means for cyclically calculating slip angle of the vehicle body based upon at least the last detected steering angle, vehicle speed, and yaw rate, the yaw rate last calculated by said yaw rate calculation means, a second feedback factor multiplied to the difference between the last detected yaw rate and the yaw rate last calculated by said yaw rate calculation means, and fixed parameters particular to the vehicle, such that the cyclically calculated yaw rate converges to the last detected yaw rate;

means for detecting saturation index against a difference between a standard yaw rate last calculated by said yaw rate calculation means and the last detected yaw rate; and means for modifying said first and second feedback factors according to said saturation index such that non-linearity between lateral forces acting at the wheels and slip angles of the wheels is compensated for by the modification of said first and second feedback factors.

2. The device of claim 1, wherein said first and second feedback factors are each calculated in at least three different manners according to increase of the value of said saturation index to provide at least first, second and third gain components, while at least three weighting factors such as first, second and third weighting factors are prepared corresponding to the value of said saturation index so that said first, second and third weighting factors have peak points at different values of said saturation index, and said first and second feedback factors are each generated by the sum of said first, second and third gain components each being weighted by the corresponding weighting factor.

3. The device of claim 1, wherein, when said saturation index is so high as to indicate that said non-linearity substantially exists, said second feedback factor is determined such that the estimated slip angle of the vehicle body increases in an orientation opposite to that in which the detected yaw rate increases.

4. The device of claim 1, wherein, when said difference between the standard yaw rate and the detected yaw is different from the yaw rate (either detected or calculated) with respect to the orientation thereof, at least one of said first and second feedback factors is modified such that lateral force acting at the rear wheels is estimated to be less in said yaw rate and vehicle body slip angle calculations, and when said difference between the standard yaw rate and the detected yaw rate is the same as the yaw rate (either detected or calculated) with respect to the orientation thereof, at least one of said first and second feedback gains is modified such that lateral force acting at the front wheels is estimated to be less in said yaw rate and vehicle body slip angle calculations.

5. The device of claim 1, wherein the vehicle is further equipped with means for detecting lateral acceleration, and braking forces of the front and rear wheels, said yaw rate calculation means cyclically calculating the yaw rate based upon at least the last detected steering angle, vehicle speed, lateral acceleration, and braking forces as variable parameters, the slip angle of the vehicle body last estimated by the vehicle body slip angle estimation device, the first feedback factor multiplied to the difference between the last detected yaw rate and the yaw rate last calculated by said yaw rate calculation means, and the fixed parameters particular to the vehicle, such that the cyclically calculated yaw rate converges to the detected yaw rate, while said slip angle calculation means cyclically calculating the slip angle of the vehicle body based upon at least the last detected steering angle, vehicle speed, lateral acceleration, braking forces and yaw rate, the yaw rate last calculated by said yaw rate calculation means, the second feedback factor multiplied to the difference between the last detected yaw rate and the yaw rate last calculated by said yaw rate calculation means, and the fixed parameters particular to the vehicle, such that the cyclically calculated yaw rate converges to the last detected yaw rate.

* * * * *